United States Patent [19]

Ludwig

[11] Patent Number: 5,405,630
[45] Date of Patent: Apr. 11, 1995

[54] METHOD OF AND APPARATUS FOR TREATING MEAT

[75] Inventor: Wolfgang Ludwig, Highland, N.Y.

[73] Assignee: WTI, Inc., Highland, N.Y.

[21] Appl. No.: 159,193

[22] Filed: Nov. 30, 1993

[51] Int. Cl.⁶ .......................... A23L 1/00; A23B 4/00
[52] U.S. Cl. ...................................... 426/231; 99/348;
  99/487; 99/535; 426/519; 426/641
[58] Field of Search ............... 426/231, 281, 519, 641;
  99/348, 484, 487, 532, 535; 366/40, 132, 151;
  452/141

[56] References Cited

U.S. PATENT DOCUMENTS 4,038,426  7/1977  Jespersen et al. .................. 426/519

Primary Examiner—George Yeung
Attorney, Agent, or Firm—Herbert Dubno

[57] ABSTRACT

As water binding to pieces of meat in a paddle massager increases, the resistance to rotation of the shaft, controlled by a frequency controller causes the speed to progressively drop as the torque input is maintained constant at a percentage of total available torque, thereby improving the water bonding without damage to the muscle tissue.

13 Claims, 5 Drawing Sheets

METHOD OF AND APPARATUS FOR TREATING MEAT

SPECIFICATION

1. Field of the Invention

My present invention relates to a method of and to an apparatus for treating meat and, more particularly, to the treatment of meat products such as hams, beef, poultry breasts, other poultry parts and fish with an aqueous solution, hereinafter referred to as a brine or pickle, and, specifically to the massaging of the brine or pickle into the meat products.

2. Background of the Invention

It is known that the water binding of an aqueous solution such as a brine or pickle into meat products, especially hams, beef, turkey breast, chicken and fish, can be improved, with or without prior injection of the brine solution into the products, by effecting a massaging step in which the meat products are agitated in the presence of the brine. If the massaging conditions are appropriate, so-called "water bind" is observed in which the solution effectively binds into the structure of the meat and remains as a moisturizing ingredient at least until the meat products are cooked to improve the texture, taste and cooking process.

Indeed, a typical system for treating products, referred to as the Myac ® process can include a brine mixer and cooler which is connected to an injector for injecting the cooled prepared brine into the meat products, a quick curing press, a vacuum massager in which the meat products are agitated and rubbed in the presence of the brine and a packaging machine. In the Myac ® process cold massage is carried out in vacuum to prevent the build up of friction heat and consequent poor water binding. Indeed, the massaging in this system is effected with paddles which have been found to have a major advantage over tumbling systems with respect to improved water binding.

It has been discovered, however, that control of the massaging process is difficult to achieve except empirically for each batch and thus reproducibility of results has been lacking in many cases in which massaging action has been applied to meat products in order to obtain water binding.

Meat is injected or a brine solution is added directly to the meat after which the meat will be massaged. Typically, the meat is being massaged for a certain time which the manufacturer deems necessary to achieve optimum bind and water holding. Most machines today have variable speed. The problem is that no one can determine exactly by time when optimum bind is reached. As a practical matter meat has been either over-massaged or under-massaged and, therefore, product consistency has varied. This is because in manufacturing it is very hard to ensure the proper amount of brine, typically 20–80%, in the meat, causing various amounts of free floating brine to be present at the start of the massage process. As a consequence it is important to be able to provide, in the injection or treatment of meat with brine, a controlled massage such that over-massage and under-massage will not occur.

OBJECTS OF THE INVENTION

It is, therefore, the principal object of the present invention to provide an improved method or process of treating meat which avoids the drawbacks of earlier methods and effects a high degree of water binding in a highly reproducible manner and with a minimum of operator involvement.

Another object of the invention is to provide a method of treating meat which provides a higher quality of treated product.

It is also an object of this invention to provide an improved apparatus for the treatment of meat.

SUMMARY OF THE INVENTION

We have discovered that in the water binding stage of massaging of meat products including all of the products described previously and especially hams, turkey breasts and pieces of beef, water binding can be effected by massaging the meat products in the presence of the brine in a paddle-type massager (with a constant energy or torque input, affording automatic control of the massaging rate in response to the degree of water binding. More particularly, the massaging speed decreases automatically (based upon increased resistance to movement) according to the invention as the water binding progresses until the desired reduced speed or massaging rate is reached. Control is therefore not by time or total energy input but by the fact that the speed of massage does not drop further at the given applied torque.

According to the invention, the massaging machine which has a frequency controller to regulate the speed of the electric motor effecting the massage, is set, by selection of an input torque, to a frequency corresponding to an optimum speed for the given amount of meat in the drum and the degree to which the meat has been injected with the brine solution, and the massage commenced. That speed corresponds to the relatively low initial torque which is a certain fraction of the maximum torque which the machine can supply. As water absorption and bind increase, because of increased mechanical resistance in the meat, massage becomes progressively more difficult and for this set torque, the frequency controller causes the speed to drop. When the lowest speed is reached, i.e. there is no further reduction in speed at an associated frequency (in hertz), bind has reached its optimum and the massage is terminated. Since the percentage of full torque at which the machine is initially set is a function of the degree of injection of brine and the amount of meat introduced into the machine, the initial percentage of full torque may be based upon experience from the weight of the meat processed, degree of filling of the machine, etc.

The invention is based upon our discovery that when the energy input to the apparatus is constant, the speed of the shaft will decrease as water binding progresses because the torque required to drive the paddles which massage the pieces of meat in the presence of the brine at the original speed increases with increasing water binding as a result of the change in texture and other properties of the pieces of meat with bind. Since the power supplied and the percentage of the torque for which the machine is set is constant and limited for the particular load, speed reduction is automatic with increasing resistance to movement and thus increasing water bind.

In the case in which the apparatus comprises a massaging drum charged with the pieces of meat which may or may not be injected with the brine, and with a quantity of the brine, and the displacement of the meat products within the drum is effected by means of a frequency-dependent electric induction motor driving a shaft carrying paddles in the drum, the frequency controller is used to energize the motor and, via microprocessor regulation of the motor controller, a total energy or power requirement for the massaging of the meat, which may have been determined empirically previously for the type of meat and the dimensions of the pieces used, can be set in terms of percent of total torque. With frequency control to maintain the set torque of the motor constant, the speed of the motor and hence the shaft will depend upon the increasing resistance provided by the meat products as water bind develops and hence the increasing torque demanded for massaging the meat, thereby causing the speed to drop progressively until the process is terminated at the point at which speed reduction terminates. The brine can be sprayed into the treatment drum.

By way of example, after the machine is loaded with brine or cure injected meat muscle, the desired degree of massaging in terms of a percentage of total torque (e.g. 50%) will be set. The RPM's of the motor are controlled by frequency. Sixty cycles will represent full speed of the massaging paddles. A knob on the torque controller will now be adjusted so that the digital hertz display will show 59 or 60 Hz corresponding, say, to 6 RPM. Based on the resistance of the product, high or low injection of brine, the machine will now run at its full speed utilizing say 50% of the total available torque, therefore, always starting at the same RPM regardless of the initial resistance of the product being massaged in the machine. As water absorption and binding start, there will be more resistance in the meat. Massaging action (speed) will automatically decrease according to the increase of bind in the meat for the given torque. The massaging process will be ended when the speed drop terminates. The speed of the massaging paddles therefore will automatically decrease over the total massage time and the machine will stop at optimum bind.

As a consequence, the massaging action initially is more rapid because of the higher speeds of the paddle and effects fast absorption of liquid without damaging the muscle tissue of which the meat product consists. As binding occurs, the massaging action continues but adjusts itself not to damage or break up the whole muscle, allowing for a fast and efficient massage action with uniform final results and without over-massaging or under-massaging.

More specifically, the method of the present invention can comprise the steps of:
  introducing pieces of meat and a pickling brine for the meat into a treatment vessel;
  with paddles affixed to a rotating shaft in the vessel, massaging the pieces of meat in the brine to effect binding of the brine in the meat, whereby resistance to rotation of the shaft by the pieces of meat increases with increased binding;
  setting a torque for said shaft at a percentage of available torque and initially driving the shaft at a relatively high speed with an electric induction motor regulated by a frequency controller and progressively driving the shaft at slower speeds automatically reflecting the increased resistance to rotation as binding increases by maintaining the set torque and reducing a frequency applied to said motor with said increased resistance; and
  terminating rotation of the shaft upon termination of a drop in the speed thereof.

The motor is preferably frequency controlled by a microprocessor receiving an input representing the percentage of total torque with which said motor is to be operated.

Where the shaft is driven by a hydraulic motor, the method can further comprise the step of maintaining a rate of power input to the motor substantially constant over a duration up to the termination.

Advantageously, the pickling brine is cooled prior to its introduction into the vessel and, moreover, a refrigerated coolant can be circulated through a jacket of the vessel.

The pieces of meat can have previously been injected with the pickling brine and can be subjected also to quick pressing before the massaging is effected.

The apparatus for treating meat can comprise
  a treatment vessel receiving pieces of meat and a pickling brine for the meat;
  a rotating shaft having paddles in the vessel for massaging the pieces of meat in the brine to effect binding of the brine in the meat, whereby resistance to rotation of the shaft by the pieces of meat increases with increased binding;
  means for setting a torque of an electric motor driving said shaft and initially driving the shaft at a relatively high speed with the set torque and progressively driving the shaft at slower speeds automatically reflecting the increased resistance to rotation as binding increases by reducing a frequency applied to said motor with increasing bind; and
  means for terminating rotation of the shaft upon termination of a drop in speed of said shaft.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
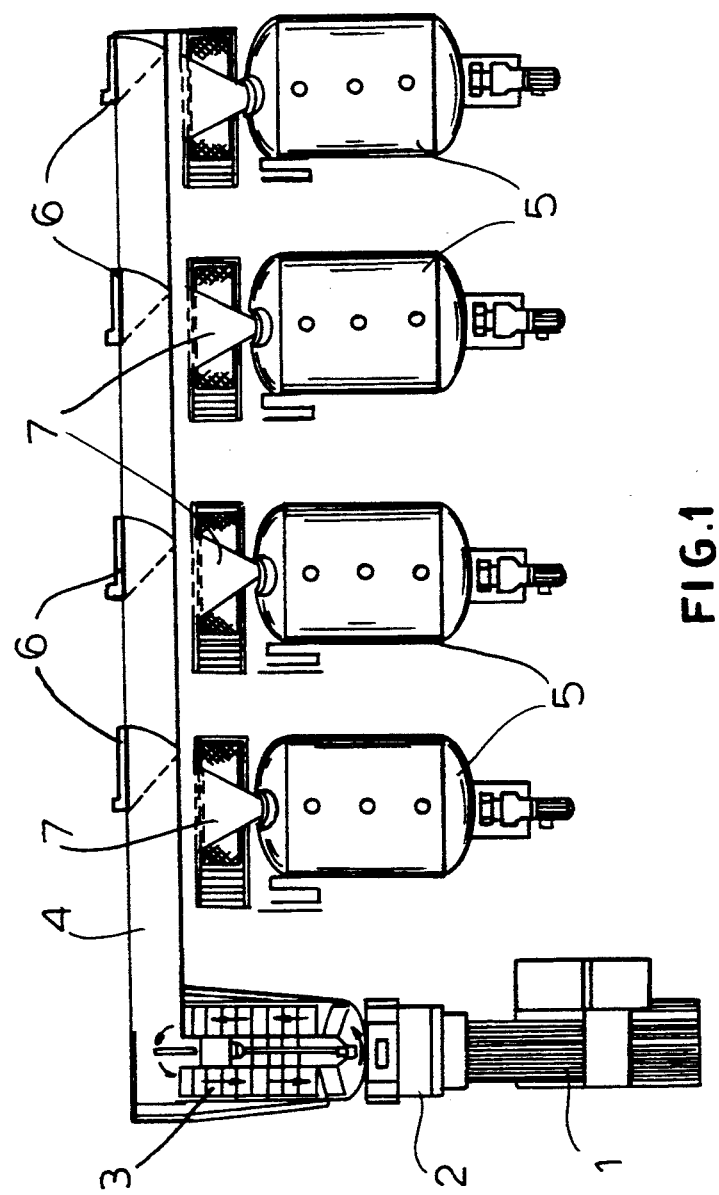
FIG. 1 is a plan view of a plant for carrying out the method or process of the invention.
Figure 2:
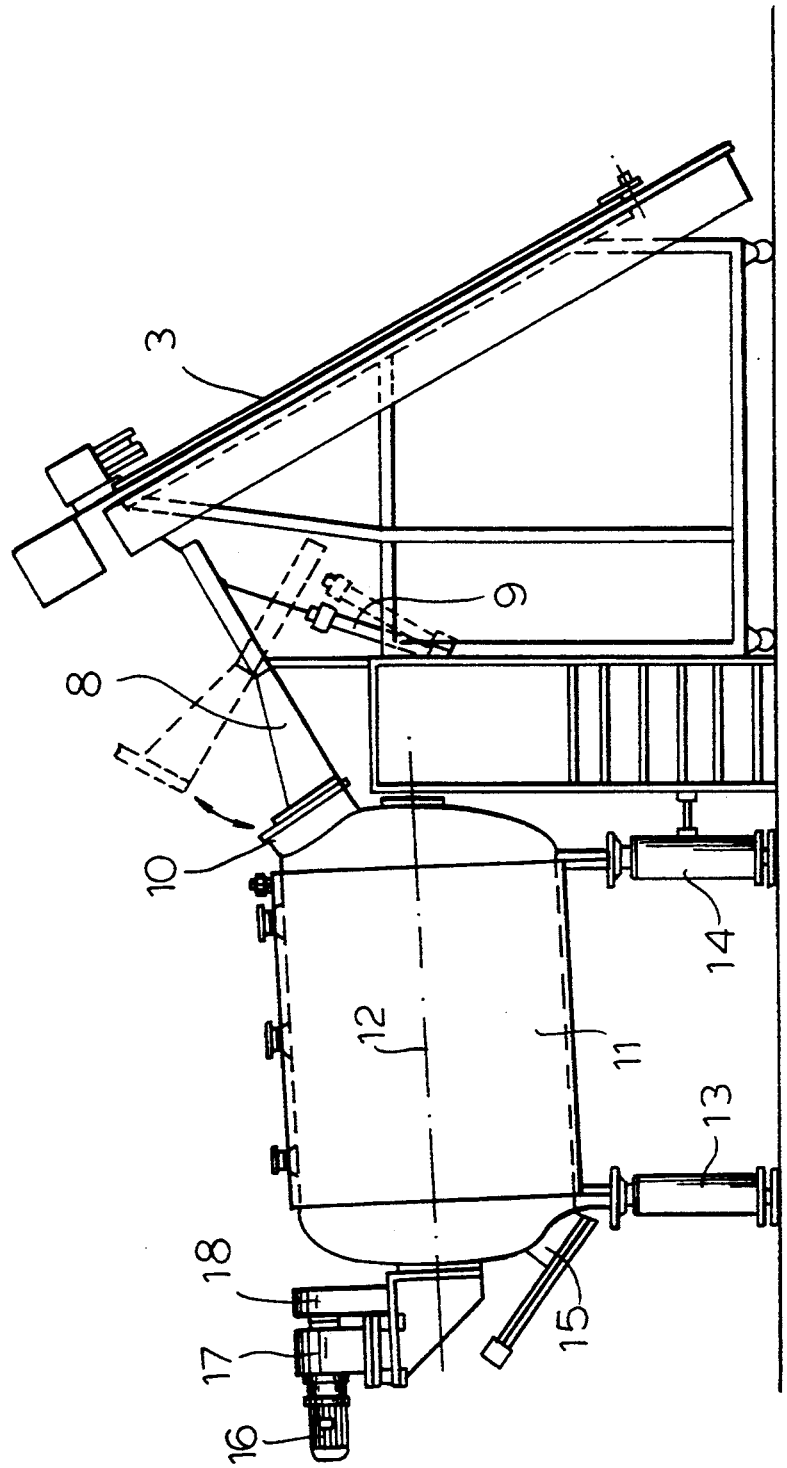
FIG. 2 is a diagrammatic side elevational view of an apparatus for massaging the pieces of meat.
Figure 3:
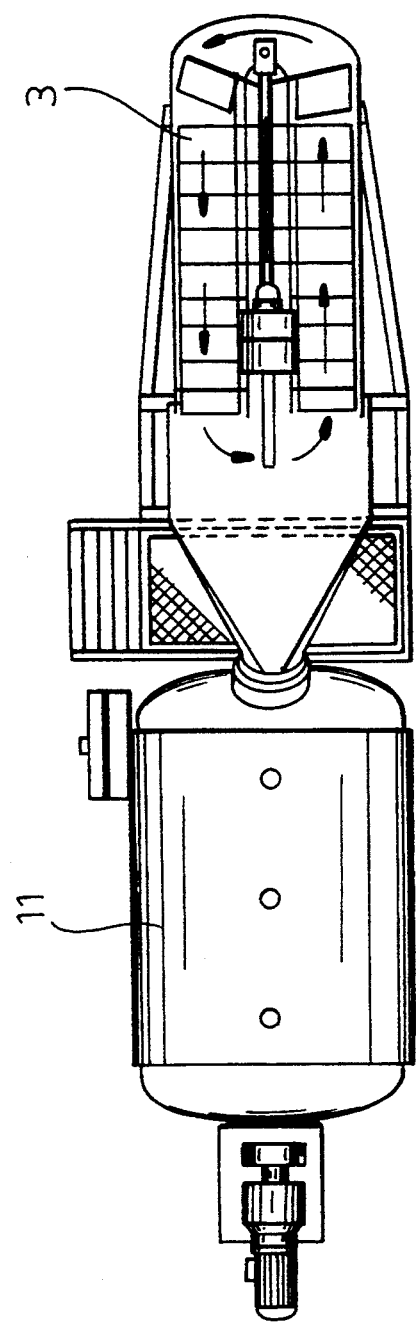
FIG. 3 is a plan view thereof.

In FIG. 1 of the drawing, I have shown an apparatus for processing meat which comprises an injector 1 in which the meat products are pierced by needles and injected with conventional pickling brine and which is followed by a cold press 2 or a steaker or macerator which can work the piece of meat to a limited extent before the pieces are displaced by a conveyor 3, preferably inclined at about 60°, onto a horizontal diverter converter 4 when a plurality of massaging units 5 are used. The massaging units 5 are associated with deflectors 6 which can extend into the path of the pieces of meat on the conveyor 4 to direct those pieces into the chute 7 at the respective mouth of the massaging unit.

The vessel 11 has an axis 12 which is only slightly inclined to the horizontal and thus is substantially horizontal in the sense of the present invention. The vessel 11 is cylindrical and is mounted on pedestals 13, 14 and has an outlet 15 from which the contents of the vessel can be discharged. Within the vessel 11, a motor 16 with step-down gearing 17 and a drive 18 drives a shaft 19 shown diagrammatically in FIG. 4.

Figure 4:
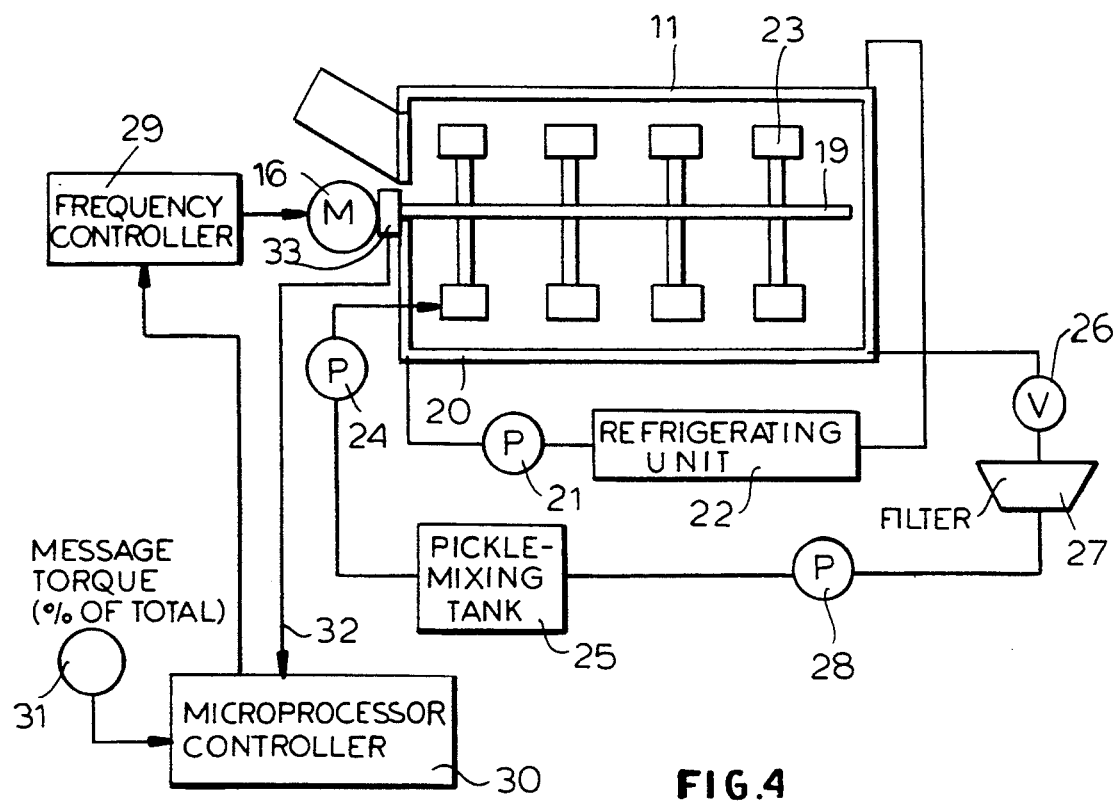
FIG. 4 is a diagram illustrating principles of the invention.

As is also apparent from FIG. 4, the vessel 11 has a cooling jacket 20 through which a coolant is circulated by a pump 21 after being chilled in a refrigerating unit 22. The cooling medium can be ammonia, Freon or a glycol like ethylene glycol.

The shaft 19 is provided with paddles 23 which agitate the pieces of meat in the vessel 11. The pieces of meat are in contact with the pickling liquid which can be sprayed onto the meat and is introduced into the vessel 11 by a pump 24 from a pickle-mixing tank 25 to which excess brine is returned via a valve 26, a filter 27 and a pump 28.

The motor 16 is provided with a frequency controller 29 which, in turn, is operated by a microprocessor unit 30 which can have a setting 31 of the massage duration in terms of massage torque. If desired, an input 32 can be provided to the microprocessor to respond to a sensor 33 of the torque applied to the shaft 19.

Figure 5:
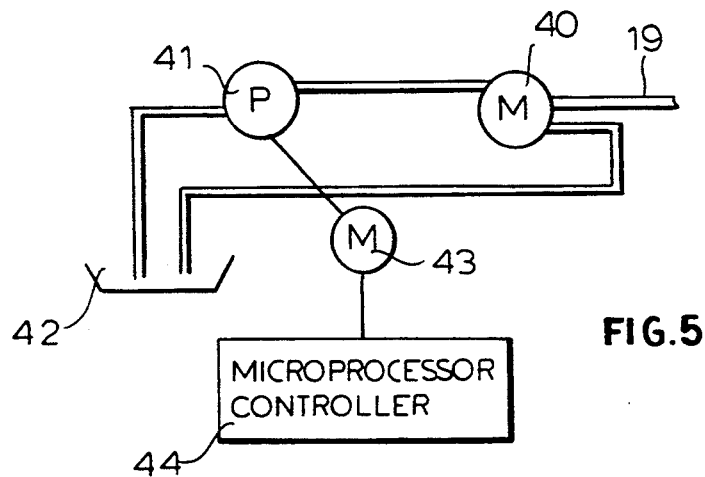
FIG. 5 shows the application in diagrammatic form, of a hydraulic motor for carrying out the process of the invention.

In FIG. 5, I have shown that the shaft 19 can be driven instead by a hydraulic motor 40 in a circuit with a hydraulic pump 41 and a hydraulic fluid reservoir 42, the pump 41 being driven by an electric motor 43 with a microprocessor controller 44 as described. Here as well, a uniform torque is supplied to the pump 41 and the speed of motor 40 will fall off with increasing binding of water. An air pressure motor can also be used.

Figure 6:
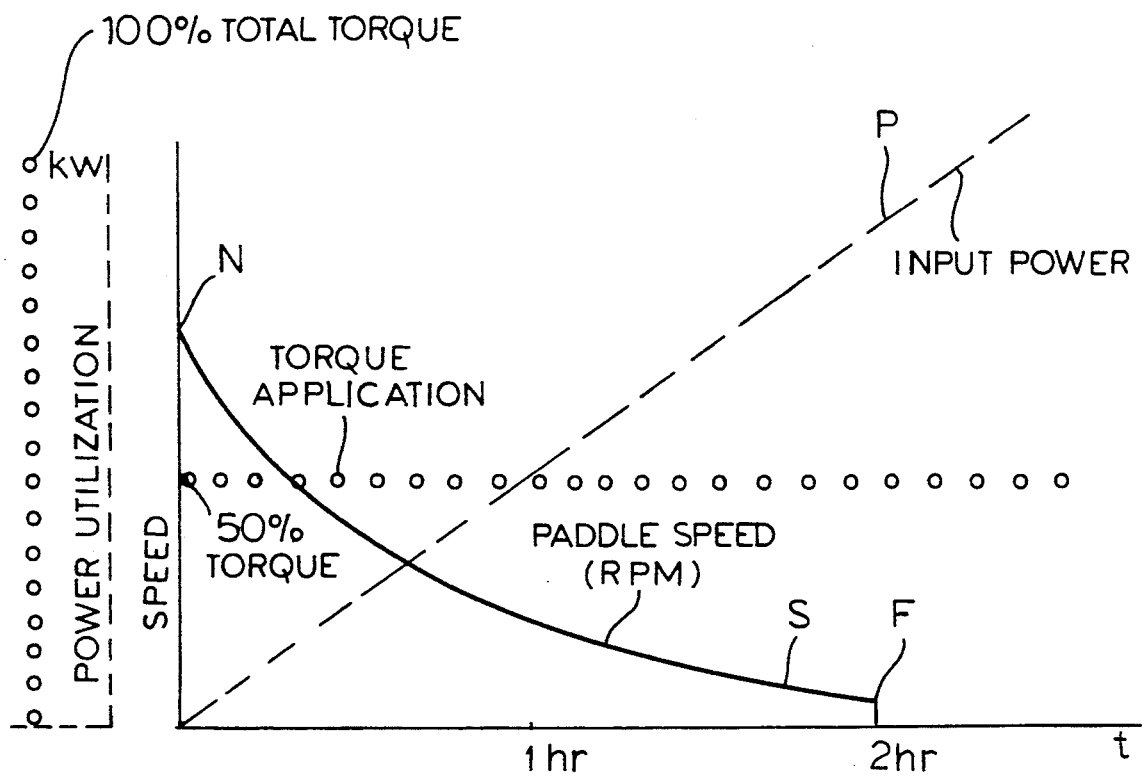
FIG. 6 is a graph indicating the relationship between input power and paddle speed.
Figure 7:
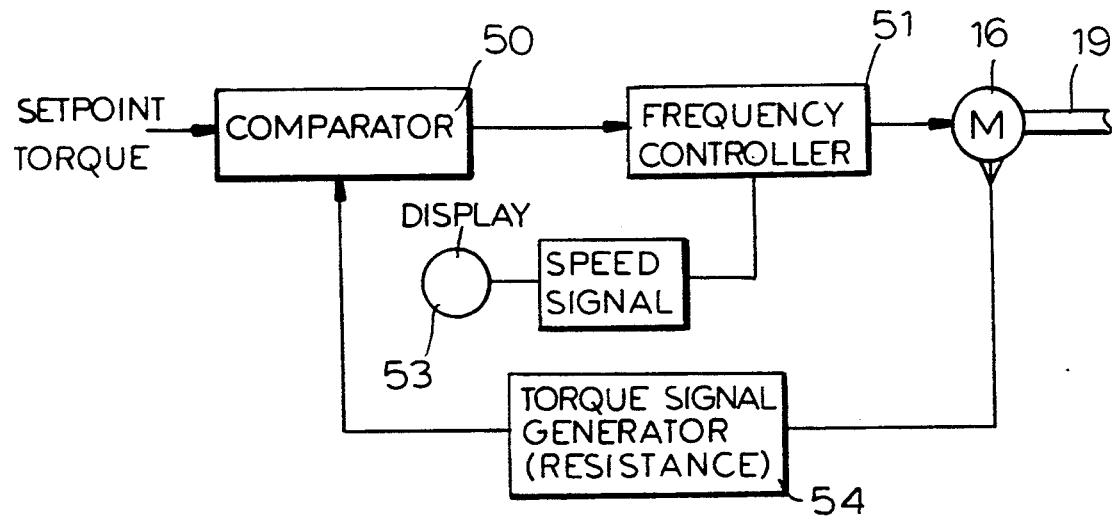
FIG. 7 is a block diagram illustrative of the invention.

Turning to FIG. 6, where as a function of time t plotted along the abscissa, I show the speed in the solid line curve S and the input power at the broken line curve P, it will be apparent that the initial speed N falls off gradually to a final speed F as water binding occurs for a given charge of meat for a substantially constant power input P so that at one hour the power utilized is half of the total input power.

The massager can be evacuated in accordance with the Myac ® system previously described. The vacuum can be drawn to 99.6%. By way of an example, the processing of hams with a conventional ham brine hitherto deemed to require a two-hour massage is set with a % of total torque (say 50%) and frequency control of the speed so that it is at its maximum initially (say 6 RPM at 60 Hz). As the water and binding start, the resistance of the meat to the paddles increases and the paddle speed drops (curve S) during the massaging under vacuum and the temperature is reduced by 7° C. per hour. When the speed reduces automatically to say 1 RPM corresponding to 10 Hz and there is no further reduction in speed, the machine is stopped. While this massaging time could be two hours, it may not be and in all cases the product will be found to be uniform regardless of the total massaging time which may result from controlling the massage by the drop in speed rather than by a given duration.

The input torque can be supplied to a comparator 50 providing a signal to the frequency controller 51 and can be compared with the output of a torque signal generator 54 in a feedback loop to maintain torque constant. The speed, as shown on a display 53 connected to a speed signal generated and indicating Hz, will fall off as described with increasing water bind.

I claim:

1. A method of treating meat, comprising the steps of: introducing pieces of meat and a pickling brine for said meat into a treatment vessel;
with paddles affixed to a rotating shaft in said vessel, massaging said pieces of meat in said brine to effect binding of said brine in said meat, whereby resistance to rotation of said shaft by said pieces of meat increases with increased binding;
setting a torque for said shaft at a percentage of available torque and initially driving the shaft at a relatively high speed with an electric induction motor regulated by a frequency controller and progressively driving the shaft at slower speeds automatically reflecting the increased resistance to rotation as binding increases by maintaining the set torque and reducing a frequency applied to said motor with said increased resistance; and
automatically terminating rotation of the shaft upon termination of a drop in the speed thereof.

2. The method defined in claim 1, further comprising the step of frequency controlling said motor to maintain a torque thereof substantially constant until termination of rotation of said shaft.

3. The method defined in claim 1 wherein said motor is frequency controlled by a microprocessor receiving an input representing a percentage of maximum torque.

4. Method defined in claim 1, further comprising the step of cooling said pickling brine prior to introducing it into said vessel.

5. The method defined in claim 1, further comprising the step of circulating a refrigerated coolant through a jacket of said vessel.

6. The method defined in claim 5, further comprising the step of injecting said pieces of meat with said pickling brine before introducing said pieces of meat into said vessel.

7. The method defined in claim 6 wherein between injection of said pieces of meat with said pickling brine and introducing said pieces of meat into said vessel, said pieces of meat are subjected to a cold pressing.

8. The method defined in claim 1 wherein said vessel has a substantially horizontal axis about which said shaft is rotatable, said pieces of meat being elevated on an elevator before being dropped into said vessel.

9. An apparatus for treating meat, comprising:
a treatment vessel receiving pieces of meat and a pickling brine for said meat;
a rotating shaft having paddles in said vessel for massaging said pieces of meat in said brine to effect binding of said brine in said meat, whereby resistance to rotation of said shaft by said pieces of meat increases with increased binding;
a frequency-controlled motor connected with said shaft for driving same;
a frequency controller connected to said motor;
means for setting said frequency controller thereby setting a torque for massaging of said pieces of meat and initially driving said shaft at a relatively high speed with said torque and progressively driving said shaft at slower speeds automatically reflecting said increased resistance to rotation as binding increases; and
means for automatically terminating rotation of said shaft upon termination of a decrease of the speed of said shaft.

10. The apparatus defined in claim 9 wherein said means for setting includes a microprocessor for controlling said frequency controller.

11. The apparatus defined in claim 9, further comprising means for injecting said pieces with said pickling brine prior to introducing said pieces into the vessel.

12. The apparatus defined in claim 11, further comprising a cold press for pressing said pieces between said means for injecting and said vessel.

13. The apparatus defined in claim 12, further comprising an elevator for said pieces between said cold press and said vessel.

* * * * *